Dec. 16, 1969     R. E. REED     3,484,172
HELICOPTER

Filed May 27, 1968     3 Sheets-Sheet 1

INVENTOR:
RICHARD EUGENE REED
BY
Elliott & Pastoriza
ATTORNEYS

Dec. 16, 1969     R. E. REED     3,484,172
HELICOPTER

Filed May 27, 1968     3 Sheets-Sheet 2

INVENTOR:
RICHARD EUGENE REED
BY
*Elliott & Pastoriza*
ATTORNEYS

INVENTOR:
RICHARD EUGENE REED
BY
Elliott & Pastoriza
ATTORNEYS

United States Patent Office 3,484,172
Patented Dec. 16, 1969

3,484,172
HELICOPTER
Richard Eugene Reed, 6396 Condor Court,
Ventura, Calif. 93003
Filed May 27, 1968, Ser. No. 732,359
Int. Cl. B64c 27/14, 27/48, 27/76
U.S. Cl. 416—18
3 Claims

ABSTRACT OF THE DISCLOSURE

An improved helicopter includes an upwardly extending mast rigidly secured to the body of the helicopter. A collar surrounds and is rotatably supported by the mast. This collar, in turn, supports an annular fuel cell structure having radially extending arms terminating in turbo-jet engines. The collar, annular fuel cell structure, radially extending arms and turbo-jet engines are thus all caused to rotate rapidly in an horizontal plane thereby defining a gyroscopically stable rotating platform. Rotor blades are coupled through a gimbal mounting to the upper end of the rotating collar and suitable control means are intercoupled with the gimbal mounting to enable tilting of the plane of rotation of the rotor blades relative to the body so that the helicopter may be properly maneuvered in any desired direction with the main body remaining substantially level or in a stabilized position.

---

This invention relates generally to helicopters and more particularly to an improved helicopter structure of the type incorporating thrust engines radially extended from the axis of rotation of the helicopter rotor blades for imparting rotary motion to the blades.

BACKGROUND OF THE INVENTION

Conventional helicopters generally comprise a main rotor blade structure positively rotated by power plants in the body or fuselage structure. These craft thus require relatively complex gearing between the power plant and the rotor assembly. Further, the torque exerted on the main body as a consequence of the rotating blades requires correction, generally in the form of a small propeller on the tail portion of the fuselage for rotation about an axis perpendicular to the lift axis and fore and aft axis of the fuselage.

The two forgoing major problems have been eliminated to a considerable extent by providing power plants in the form of jet engines on the tips of the rotor blades themselves. Driving the rotor blades in this manner not only eliminates much of the heretofore necessary complex gearing but in addition substantially removes any problem of torque correction so that an auxiliary propeller is unnecessary. Nevertheless, there are still serious problems encountered in such helicopter designs.

For example, it is well known that jet engines are extremely inefficient at low speeds and thus when the rotor blades are not rotating rapidly, the use of jet engines is wasteful. Further, the presence of a jet engine on the rotor blade structure can seriously interfere with proper design and operation of the blade itself as a device for creating lift. In this respect most helicopters are maneuvered by changing the plane of rotation of the rotor blades with respect to the vertical. This change in the plane of rotation with massive jet engines on the tips of the rotor blades gives rise to undesirable gyroscopic forces and makes for difficulties in maneuvering the craft.

Other problems relating to helicopters both of conventional design and of the forgoing proposed types relate to proper isolation of vibrations of the rotor blades from the main body of the helicopter itself, proper fuel distribution to the helicopter engines, overall stability in flight, and the well known relatively complex and large number of working components deemed necessary to provide a workable helicopter. All of these factors contribute greatly to the weight of the helicopter and the overall manufacturing expense.

BRIEF SUMMARY OF THE PRESENT INVENTION

The present invention provides a novel helicopter so designed as to overcome the above noted problems inherent in present day helicopters. In accord with the invention, there is provided a body or fuselage having a generally vertically extending mast rigidly secured to the body. A collar means in the form of an elongated cylinder coaxially surrounds the mast. A suitable thrust bearing structure is provided for enabling rotation of the collar relative to the mast.

An annular shaped fuel cell structure coaxially surrounds the collar and is rigidly secured to the collar for rotation therewith. One or more radial arms extend from the fuel cell structure and terminate in turbo-jet engines. With this arrangement, the collar may be caused to rotate at a rapid rate, fuel for the jet engines being fed under pressure to the engines by centrifugal force from the annular fuel tank.

At the upper end of the collar structure there is provided a first gimbal mounting for rotor blades so that the rotor blades are driven by the rotating collar. Suitable control rods extend from the body to the gimbal mounting for the blade to enable tilting of the plane of rotation of the blades relative to the rigid mast and collar axis and thus relative to the body of the helicopter. The rapidly rotating annular fuel cell and jet engines provide a gyroscopically stable platform so that the body of the helicopter will always remain level, the helicopter being maneuvered by simply varying the plane of rotation of the rotor blades themselves.

The invention further contemplates novel collective pitch control means for the rotor blades and novel elastomer bearing type mounting means for each individual blade to the gimbal structure of the collar.

BRIEF DESCRIPTION OF THE DRAWINGS

A better understanding of the invention will be had by now referring to the accompanying drawings in which.

DETAILED DESCRIPTION OF THE PREFERRED EMBODIMENT

Figure 1:
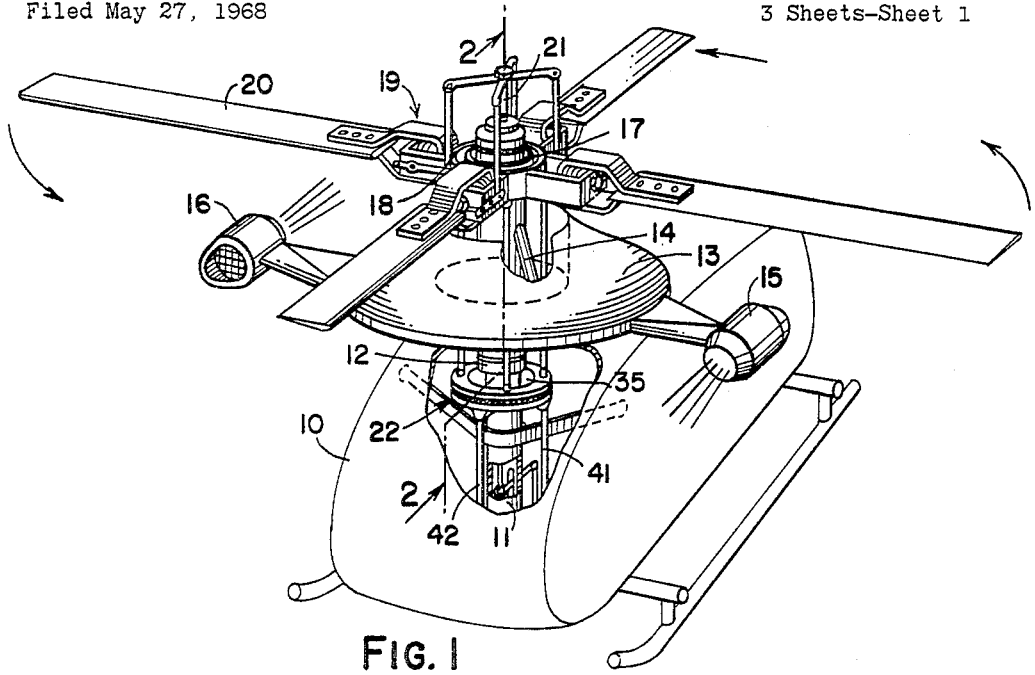
FIGURE 1 is a perspective view partly cut away of the improved helicopter of this invention.

Referring first to FIGURE 1, there is shown a helicopter including a body or fuselage 10 incorporating a mast 11 extending generally vertically from the body. As shown, the mast 11 is rigidly secured to the body, preferably by means of a large base plate bolted to the lower frame structure (not shown) and upper, laterally extending, struts which are visible in the broken-away portion of the drawing.

An elongated cylindrical collar 12 coaxially surrounds the mast 11 and is mounted to the mast for rotation. Secured to this collar is an annular fuel cell structure 13. This fuel cell structure is generally toroidally shaped and is provided with an aerodynamically smooth upper curved surface as shown. The securement of the cell to the collar is effected by suitable struts one of which is visible at 14.

In the embodiment shown for illustrative purposes, the fuel cell structure 13 includes diametrically opposite radially extending arms terminating in turbo-jet engines 15 and 16. These engines are oriented to exert thrust generally in an horizontal plane such that operation of the engines will cause rapid rotation of the fuel cell structure 13 and collar 12 about the stationary mast 11.

Figure 2:
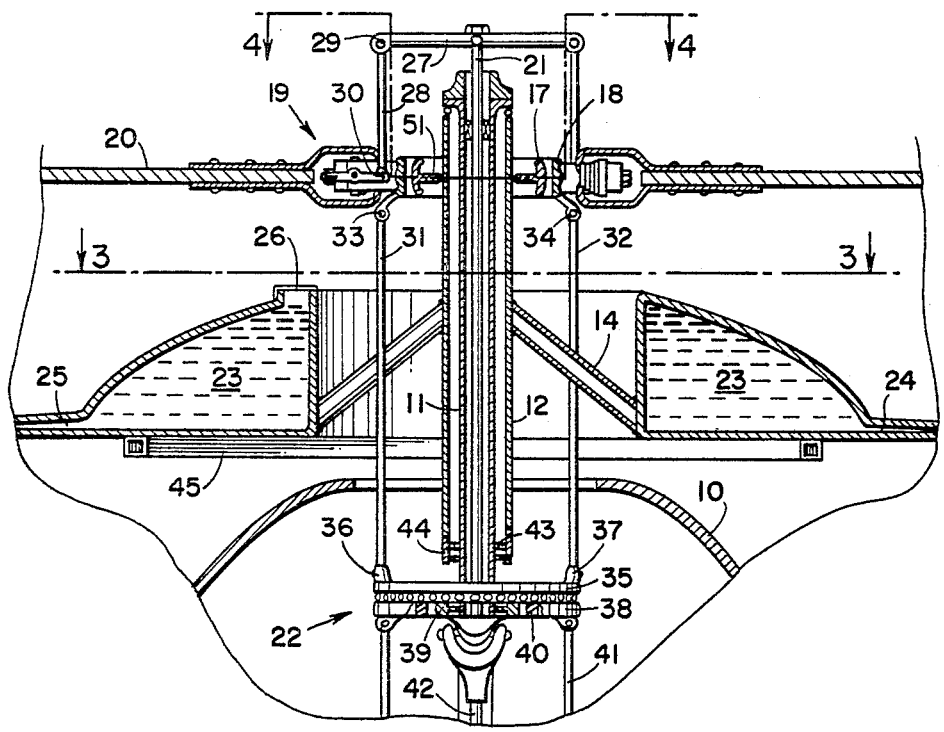
FIGURE 2 is an enlarged fragmentary cross section taken generally in the direction of the dashed line designated by the arrows 2—2 of FIGURE 1.

As shown in both FIGURES 1 and 2, the upper portion of the collar mounts an inner gimbal ring 17. An outer gimbal ring 18 in turn is pivoted to the inner gimbal ring and includes four circumferentially spaced blade mounting means such as 19 for supporting rotor blades such as rotor blade 20. The rotor blade mounting means 19 incorporates a journal bearing for pitch variation and an elastomer mounting and will be described in detail subsequently. The gimbal rings 17 and 18 permit tilting of the plane of rotation of the rotor blades relative to the collar, mast, and body of the helicopter.

A rotatably mounted collective pitch control shaft 21 extends interiorally of the mast 11 and is intercoupled to the various rotor blade mounting means by a linkage means such that up and down movement of the pitch shaft 21 within the mast 11 will vary the pitch of the various blades. The tilting of the plane of rotation of the blades in turn is effected by means of a swash plate assembly designated generally by the arrow 22 shown within the body structure below the fuel cell 13.

Further details of the components described in FIGURE 1 will become clear by now referring to FIGURE 2. Thus, the annular arrangement of the fuel cell structure 13 will be clear from the cross section. The fuel itself fills the toroidal chamber 23 which is radially spaced from the collar structure 12 by the struts 14 to leave a relatively large central opening. Suitable fuel lines such as indicated by 24 and 25 pass directly from the fuel cell chamber to the turbo-jet engines at the tips of the arms. A fill cap for the chamber is shown at 26.

The foregoing design of the fuel cell structure constitutes an important feature of the present invention and provides several advantages. First, when the entire fuel cell structure 13 is rotating rapidly, the fuel will be supplied to the engines under pressure and no fuel pumps are required. Further, as a consequence of the interior design of the fuel cell, there will be no waste of fuel whatsoever. In other words, all of the fuel will be used because of the centrifugal force action. In addition, the fuel itself constitutes a mass which, upon rapid revolving about the central axis or mast in its radially spaced position provides a gyroscopically stable platform. In this respect, the weight or mass of the fuel, which is always present in any helicopter, along with the mass of the tank and engines, is put to advantage in stabilizing the helicopter, all as will become clearer when the operation is described.

In FIGURE 2, it will be noted that the collective pitch control shaft 21 includes horizontally extending coupling rods such as the rod 27. The far ends of these rods are coupled to the upper ends of vertical rods such as 28 as by suitable ball-and-socket type universal joints such as 29. The inner ends of the rods 27 are rigidly secured to the upper end of the collective pitch shaft 21 extending from the stationary mast 11. The lower end of the vertical rod 28 terminates in a second universal joint 30 coupled through additional linkage to the elastomer bearing mounting 19 for the rotor blade 20 in such a manner as to vary the pitch of the blade upon up and down movement of the vertical rod 28. This movement, in turn, is controlled by up and down movement of the collective pitch control shaft 21. These linkages will be described in greater detail subsequently.

Referring now in detail to the swash plate assembly 22 in the lower portion of FIGURE 2, there are provided a series of vertical control rods 31 and 32 coupled to the outer gimbal 18 as by universal joints 33 and 34. The lower ends of these rods in turn are coupled to a first disc plate 35 as by universal couplings 36 and 37. The first plate 35 overlies a second disc shaped plate 38 and is mounted for rotation on the plate 38 by suitable thrust bearings. Plates 35 and 38 have central openings through which the mast 11 extends.

The lower or second plate 38 is mounted by a second gimbal mount comprising inner and outer gimbal rings 39 and 40 to the mast 11. Further control rods such as indicated at 41 and 42 extend from bottom circumferential portions of the second plate 38 and are coupled to suitable controls in the body 10 of the helicopter.

With the forgoing arrangement, it will be understood that the second plate 38 is rotationally stationary since it is gimbaled directly to the stationary mast 11. However, this lower plate 38 may be tilted in any plane as a consequence of the second gimbal mounting to the mast. The first or top plate 35 in turn will rotate with the collar 12 since it is gimbaled thereto at the upper gimbal connections 33 and 34.

It will now be evident that tilting of the lower plate 38 can be effected in any desired direction by the control rods 41 and 42 as a consequence of its gimbal mounting to the stationary mast. Such tilting will thus result in the upper plate 35 assuming a similar tilt and this motion will be transmitted to the first gimbal rings 17 and 18 to effect a tilting of the plane of rotation of the rotor blades in any desired direction.

The horizontally extending rods 27 along with the pitch control shaft 21 will rotate with the gimbals and collar, but because of their securement to the shaft 21, they will remain in an horizontal plane; that is a plane parallel to the plane of rotation of the fuel cell structure and engine carrying arms. Therefore, tilting of the plane of rotation of the rotor blades will automatically effect a cyclic pitch control of the blades since the positions of the ends of the vertically extending rods 28 relative to the outer gimbal ring will vary.

Referring again to the lower portion of FIGURE 2, it will be noted that the collar 12 terminates short of the upper or first swash plate 35. At this portion of the structure, there is provided a series of collector rings 43 secured to the mast 11 and cooperating with brushes 44 at the lower end of the collar 12 for enabling the transmission of various electrical control signals between the stationary mast 11 and the rotating collar 12. Proper operation of the turbo-jet engines through suitable electrical conductors in the rotating collar passing through the structural supports such as 14 and fuel cell structure to the engines is thus possible.

Figure 3:
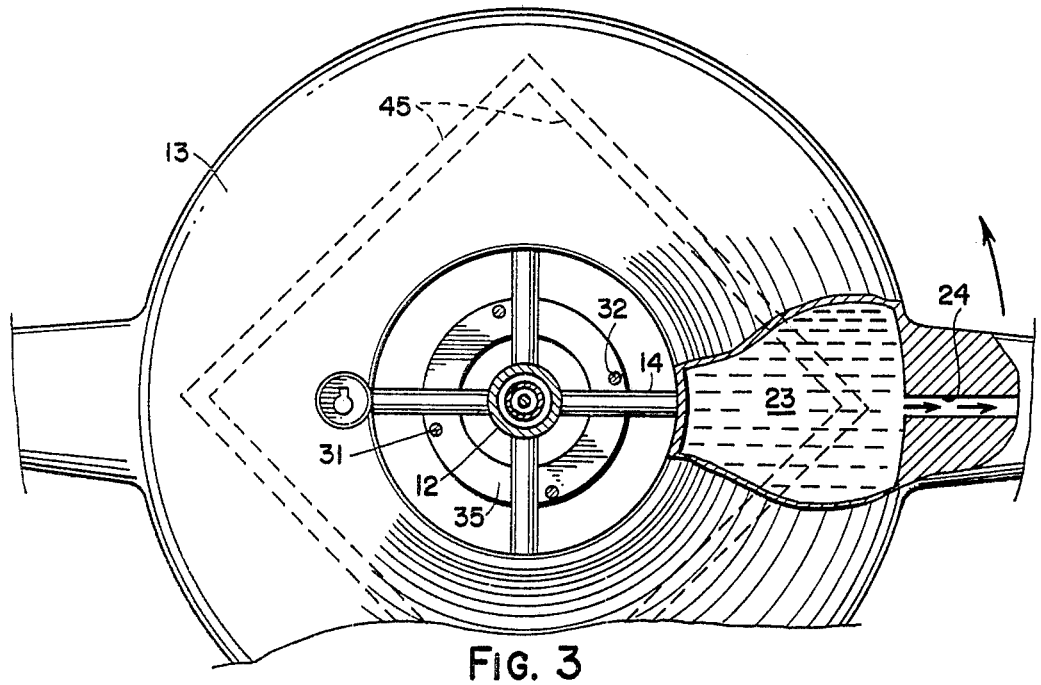
FIGURE 3 is a fragmentary plan view partly broken away taken in the direction of the arrows 3—3 of FIGURE 2.

Referring now to FIGURE 3, it will be noted that there are provided four vertical rods such as the rods 31 and 32 described in FIGURE 2 circumferentially positioned with respect to the top swash plate 35 to pass between the radially extending supporting struts 14 securing the fuel cell structure 13 to the collar 12.

For proper strength, there may be provided a lower truss frame shown in dotted lines at 45 in the fuel cell structure 13.

In the plan view of FIGURE 3, there is indicated by the arrows the passage of fuel through the fuel line 24 in one of the radially extending arms. As mentioned, this fuel is forced to the turbo-jet engines under pressure as a consequence of centrifugal force and since the fuel line is coplaner with the floor of the fuel chamber 23 as shown in FIGURE 2, all fuel will be consumed.

Figure 4:
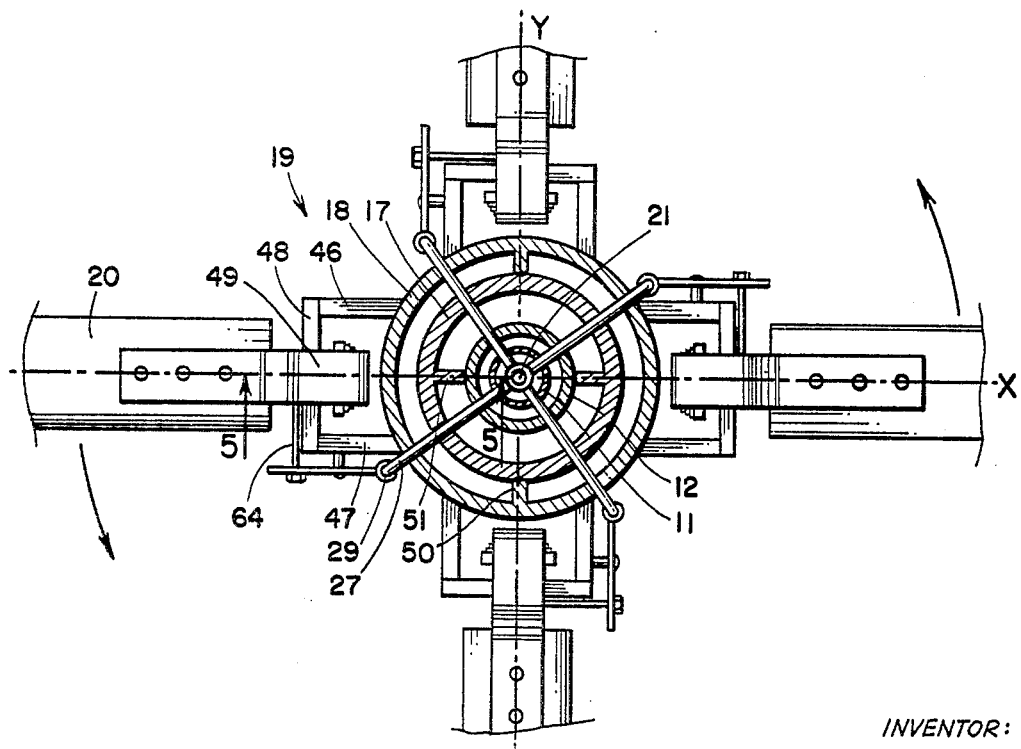
FIGURE 4 is a fragmentary plan view taken in the direction of the arrows 4—4 of FIGURE 2.

Referring now to FIGURE 4, further details of the rotor blade mounting means 19 will be described. Since the mountings for each blade are identical, a detailed description of one will suffice for all. As shown, there are provided first and second side plates 46 and 47 rigidly secured to the outer gimbal ring 18 and extending generally radially in horizontally spaced vertical parallel planes. The outer ends of these sideplates serve to support an outer bearing race shown partly at 48. A stirrup structure 49 in turn secured to the rotor blade 20 passes between the plates 46 and 47 and is rotatably coupled to the bearing 48.

The outer gimbal 18 securing the plates 46 and 47 is shown in FIGURE 4 pivoted to the inner gimbal 17 as at fore and aft pivot points 50 whereas the inner gimbal 17 is shown pivoted to the collar 12 at 90 degree spaced points as indicated at 51.

Figure 5:
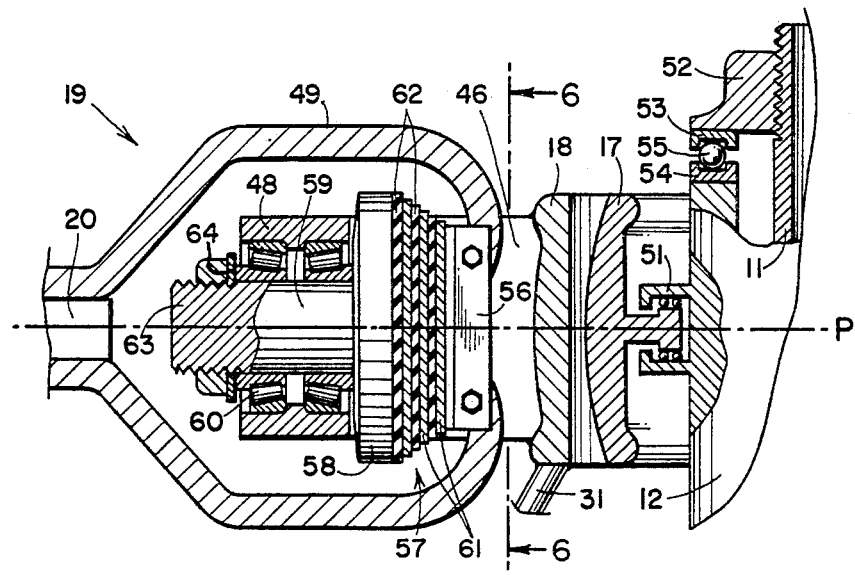
FIGURE 5 is an enlarged fragmentary view partly in cross section taken in the direction of the arrows 5—5 of FIGURE 4.

In the larger view of FIGURE 5, the pivot 51 for the inner gimbal ring 17 is shown in cross section. The outer pivot 50 for the outer gimbal ring 18 may be similarly designed.

At the upper right hand portion of FIGURE 5, there is shown in the broken-away part of the drawing details of the thrust bearing for rotatably mounting the collar 12 to the stationary mast 11. As shown, the mast 11 terminates in an upper nut 52 supporting a bearing race 53 cooperating with a lower bearing race 54 secured to the upper end of the collar 12. Suitable ball bearings 55 are disposed as shown so that the collar 12 is rotatably mounted to the stationary mast 11.

The elastomer bearing mounting for the rotor blades indicated generally by the numeral 19 is shown in considerably greater detail in the central portion of FIGURE 5. Thus, the stirrup structure 49 extends between the plates 46 and 47 as described in FIGURE 4 and supports at its inner end a first bearing plate 56 facing radially outwardly towards the outer bearing race 48 at the ends of the plates. An elastomer structure 57 extends from the plate 56 to terminate in a second larger bearing plate 58. The plate 58 faces the first plate 56 in spaced relationship thereto to accommodate the elastomer structure 57. Plate 58 also includes a journal shaft 59 supporting an inner bearing race received within the outer bearing race structure 48. Suitable roller bearings 60 are positioned as shown to provide a combined thrust and roller bearing for rotation of the rotor blade 20 and stirrup structure 49 about the span wise axis of the rotor blade. In FIGURE 5, this span wise or pitch axis is designated by the letter P.

The elastomer bearing 57 includes alternate discs of rigid and resilient material such as indicated at 61 and 62 respectively. The disc 61 may be of high grade metal and the resilient material 62 may constitute a rubber like compound. The design is such that oscillations, flapping, and other vibrations of the rotor blade are properly damped so that the same are isolated from the gimbal mounting and remaining structure of the helicopter.

The control of the pitch or rotation of the rotor blade 20 and the stirrup structure 49 about the pitch axis P is effected by rigidly securing to a nose portion 63 of the journal shaft 59 a cantilevered bar 64 which extends normally out of the plane of the drawing of FIGURE 5. This bar thus extends from between the stirrup structure 49 beyond the side plate 47 as illustrated in FIGURE 4.

Figure 6:
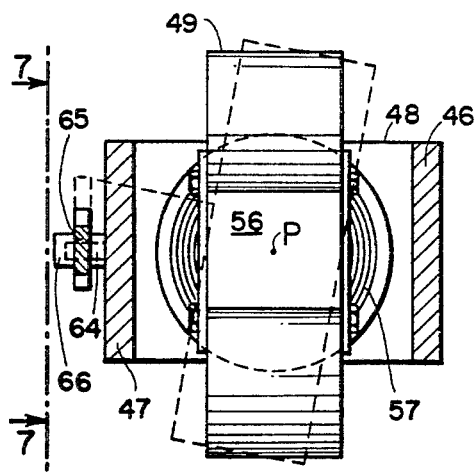
FIGURE 6 is a cross section taken in the direction of the arrows 6—6 of FIGURE 5.
Figure 7:
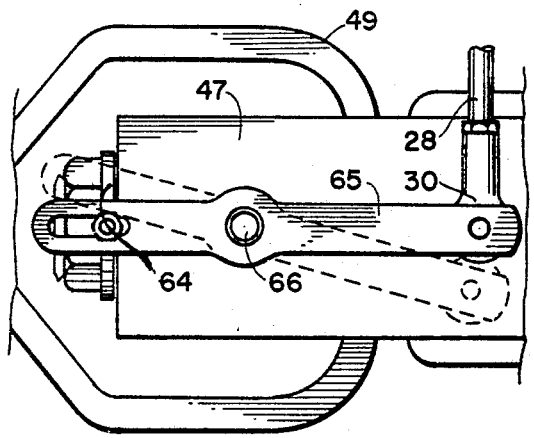
FIGURE 7 is a fragmentary side elevational view of the structure illustrated in FIGURE 5; and, FIGURE 8 is a qualitative plot of variation in lift with rotor blade pitch angle useful in explaining important features of the invention.

With particular reference to FIGURES 6 and 7, the free end of the bar 64 is loosely coupled by a lost motion coupling to one end of a pitch control lever 65 pivoted to the sideplate 47 and 66. The other end of the pitch control lever 65 is coupled through the universal joint 30 to the lower end of the vertical rod 28. It will be recalled from the description of FIGURE 2 that the rod 28 in turn is coupled to the horizontal rod 27 from the pitch control shaft 21 as by universal coupling 29.

From FIGURES 6 and 7, it will be evident that if the rod 28 moves downwardly, the pitch control lever rod 65 will pivot about the pivot point 66 to raise the free end of the bar 64 and thus effect a rotation of the stirrup and blade structure about the pitch axis P. The rotation is in such a direction as to increase the pitch angle of the blade as viewed in FIGURE 6. A partial rotation is indicated by the dotted line showing of the stirrup structure 49.

With reference once again to the views of FIGURES 1 and 2 and with the collective pitch control linkages in mind, assume first that the plane of rotation of the rotor blades is tilted forwardly by means of the swash plate assembly 22. This tilting would be effected by pulling downwardly on the front control rod 42 for the bottom plate 38 described in FIGURE 2 and this action in turn would tilt the upper swash plate 35 and through the connecting rods tilt the inner and outer gimbals 17 and 18 forwardly about the pivots 51. Since the horizontally extending rods such as the rod 27 from the pitch control shaft 21 are maintained in a horizontal plane at all times, it will be evident that as the vertical rod 28 rotates with the collar towards the front of the structure with reference to FIGURE 2, the rotor blade mounting means 19 will move lower relative to the rod 28 thereby resulting effectively in an upward movement of the rod. In FIGURE 7, such an upward movement, opposite in direction to that indicated by the dotted lines, relative to the sideplates and stirrup assembly will result in a decreasing of the pitch of the rotor blade 20 as the same extends in the forward direction of flight.

After 180 degrees of rotation, the tilting of the plane of rotation of the rotor blades will result in an effective downward movement of the vertical rod 28 relative to the mounting when the blade is extending in a rearward or opposite direction to that of the direction of flight and thus the pitch angle of the blade will be increased.

It will therefore be evident that an automatic cyclic pitch control is effected if the collective pitch control shaft 21 is held in a stationary position and the plane of rotation of the rotor blades is tilted. Of course if the plane of rotation of the rotor blades is held level or horizontal, then the pitch will remain at the angle determined by the vertical position of the collective pitch shaft 21.

Figure 8:
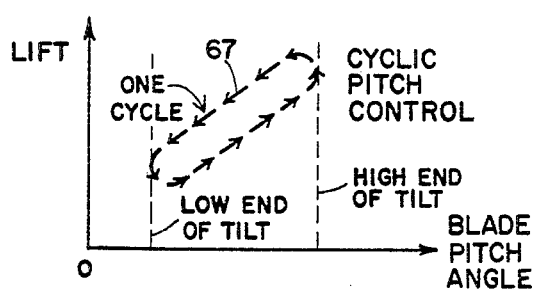

In FIGURE 8, there is indicated by the plot 67 a diagrammatic showing of the above referred to cyclic pitch control. Thus, it will be noted that the blade pitch angle is minimum when the blade is passing through its low end tilt position and is maximum when the blade is passing through the high end tilt position. In the example chosen wherein the plane of rotation of the rotor blades is tilted forwardly for forward motion of the helicopter, the lift will be greatest at the rear portion of the plane of rotation of the blades and minimum at the forward position of the plane of rotation so that forward driving of the helicopter will result.

OPERATION

With the forgoing description in mind, the overall operation of the helicopter will now be described.

Initially, the collective pitch control shaft 21 as described in FIGURES 1 and 2 is positioned in a proper vertical position so that the pitch angle of the various rotor blades is substantially zero or in a condition such that no lift will result when the blades are rotated. This adjustment may be effected by up and down movement of a thrust bearing in the mast 11 by suitable controls shown in the broken-away portion of the mast in FIGURE 1.

The turbo-jet engines 15 and 16 may now be started by suitable electrical controls energized through the collector rings and brushes 43 and 44 described in FIGURE 2. Starting of these engines will result in rotation of the fuel cell structure 13, collar 12, associated upper swash plate 35, first gimbal rings 17 and 18 and the coupled rotor blades. The entire rotating structure is brought up to optimum speed while the helicopter is still resting on the ground. The operation of the jet engines can thus be optimized since the rotation of the rotor blades may remain constant without affecting operation of the helicopter.

When it is desired to take off, it is only necessary to lower the vertical position of the collective pitch shaft 21 which action in turn will effectively lower all the vertical rods such as the rod 28 and thereby increase the angle of attach of the respective rotor blades from zero to a desired angle. The helicopter will then simply lift up vertically.

Maneuvering in any direction can the readily take place by operation of the swash plate assembly which will tilt the plane of rotation of the rotor blades in the desired direction of movement. With the collective pitch shaft 21 held in a set vertical position, the cyclic pitch control of the blades will result in optimum aerodynamic performance as described in conjunction with FIGURE 8 to properly move the craft in a desired direction.

It should be understood that the plane of rotation of the fuel cell structure and turbo-jets will always remain substantially horizontal, the combined mass of the fuel cell, radially extending arms and turbo-jets creating effectively a gyroscopically stable platform. The body 10 will thus remain level or horizontal at all times regardless of the direction in which the helicopter is maneuvered. Since the rotor blades 20 themselves constitute a relatively light structure as compared to the jet engines and fuel cell structure, there are substantially no adverse or unstable-moment forces created by the rotating rotor blades when the plane of rotation is changed. The blade coriolis forces resulting from articulation are fully isolated from the airframe by the coincident elastomeric bonded mountings. Further, proper pitch control is readily realizable since the rotor blades themselves are unencumbered with tip type jet engines.

Landing of the helicopter is effected by simply again varying the pitch of the rotor blades by the pitch control shaft 21 to a small angle to decrease the lift sufficiently to lower the helicopter body 10.

From the forgoing description, it will thus be evident that the present invention has provided a greatly improved helicopter design wherein various problems encountered with helicopters heretofore have been wholly eliminated. Further, it will be evident that a minimum number of component parts are required for the particular design involved with the desirable end result of reliability in operation of the helicopter and minimum manufacturing expense.

What is claimed is:
1. A helicopter comprising, in combination:
    (a) body;
    (b) a generally vertically extending mast rigidly secured to said body;
    (c) collar means surrounding said mast;
    (d) bearing means mounting said collar means to said mast for rotation about a vertical axis coaxial with said mast;
    (e) thrust engine means laterally supported to said collar means at a given radial distance from said axis to exert a thrust generally in an horizontal plane thereby rotating said collar means about said vertical axis;
    (f) rotor blade means;
    (g) first gimbal mounting means coupling said rotor blade means to said collar means for rotation therewith, said rotor blade means comprising at least two blades extending in different radial directions;
    (h) elastomer bearing mounting means for articulating each blade to said gimbal means, said elastomer bearing mounting means including a first member secured to an associated blade; a second member positioned in opposed spaced relationship to said first member; bearings rotatable mounting said second member to said first gimbal means; a series of alternate rigid and resilient discs stacked in face-to-face engagement and secured to and between said first member and second member to resiliently mount the same relative to each other;
    (i) a collective pitch control shaft passing from said body interiorly of said mast;
    (j) linkage means coupling the upper end of said shaft to said second member whereby the pitch of said rotor blades may be adjusted by moving said control shaft up or down to rotate said second member on said bearings relative to said first gimbal means; and,
    (k) control means extending from said body and coupled to said first gimbal means for enabling the plane of rotation of said rotor blade means to be tilted in any desired direction relative to said body to thereby control movement of said helicopter without changing the attitude of said body so that said body remains substantially level while flying.

2. A helicopter according to claim 1, in which said thrust engine means includes an annular fuel cell structure surrounding said collar means and rigidly secured thereto, said fuel cell structure including at least one radially extending arm having a fuel passage therethrough; and a turbo-jet engine mounted on the end of said arm and connected to said fuel passage to receive fuel under pressure resulting from contrifugal force when said collar and fuel cell structure are rotated about said mast, the combined mass of said collar, fuel cell structure and fuel therein, arm and turbo-jet engine providing a gyroscopic effect to stabilize said helicopter body.

3. A helicopter according to claim 1, in which said control means includes: a swash plate assembly comprised of first and second disc plates coaxially positioned with central openings through which said mast extends, said first plate being bearingly supported on top of said second plate for rotation thereon; second gimbal means coupling said second plate to said mast; and gimbal control rods extending between said first plate and said first gimbal means such that tilting of said second plate relative to said mast effects tilting of said first plate while rotating to thereby tilt the plane of rotation of said rotor blade means, and whereby holding of said control shaft in a set position and tilting of the plane of rotation of said rotor blades results in an automatic cyclic pitch control such that the angle of attack of each rotor blade when extending in the direction of travel of said helicopter is smaller than the angle of attack of each rotor blade when extending in the opposite direction.

References Cited

UNITED STATES PATENTS

| 2,633,922 | 4/1953 | Svenson | 170—135.4 |
| 2,689,615 | 9/1954 | Fletcher | 170—135.4 X |
| 3,111,172 | 11/1963 | Gorndt et al. | 170—160.53 X |

FOREIGN PATENTS

| 941,626 | 7/1948 | France. |
| 1,011,478 | 4/1952 | France. |
| 612,189 | 11/1948 | Great Britain. |

EVERETTE A. POWELL, JR., Primary Examiner

U.S. Cl. X.R.

416—102, 168, 171